United States Patent [19]
Tsubota et al.

[11] Patent Number: 5,638,199
[45] Date of Patent: Jun. 10, 1997

[54] LIQUID CRYSTAL DISPLAY DEVICE AND METHOD FOR REPAIRING DEFECTIVE PORTIONS THEREOF

[75] Inventors: Kojiro Tsubota; Yoji Yoshimura; Yutaka Takafuji, all of Nara, Japan

[73] Assignee: Sharp Kabushiki Kaisha, Osaka, Japan

[21] Appl. No.: 363,020

[22] Filed: Dec. 23, 1994

[30] Foreign Application Priority Data

Dec. 24, 1993 [JP] Japan .................................. 5-326427

[51] Int. Cl.⁶ .................... G02F 1/136; G02F 1/1333; G02F 1/13
[52] U.S. Cl. ................ 349/110; 349/42; 349/192
[58] Field of Search ...................... 359/59, 67, 79

[56] References Cited

U.S. PATENT DOCUMENTS

| | | | |
|---|---|---|---|
| 5,142,386 | 8/1992 | Ishihara | 359/45 |
| 5,267,066 | 11/1993 | Nakai et al. | 359/67 |
| 5,280,374 | 1/1994 | Nakai et al. | 359/67 |
| 5,335,102 | 8/1994 | Kanemori et al. | 359/59 |
| 5,368,991 | 11/1994 | Uchikawa et al. | 430/288 |
| 5,422,207 | 6/1995 | Yoda et al. | 430/7 |

FOREIGN PATENT DOCUMENTS

| | | |
|---|---|---|
| 243635 | 12/1985 | Japan . |
| 1-187532 | 7/1989 | Japan . |
| 243917 | 10/1991 | Japan . |
| 4-274407 | 9/1992 | Japan . |

Primary Examiner—Anita Pellman Gross
Assistant Examiner—Toan Ton
Attorney, Agent, or Firm—Birch, Stewart, Kolasch & Birch, LLP

[57] ABSTRACT

According to the present invention, a method for repairing a defective pixel of a liquid crystal display device is provided. The liquid crystal display device includes a first transparent substrate on an internal surface of which switching elements are formed; a second transparent substrate which is provided being spaced apart from the first transparent substrate and on an internal surface of which a black mask pattern is formed; liquid crystal interposed between the first and the second transparent substrates having a twisted-nematic orientation; and two polarizing plates provided on external surfaces of the first and the second transparent substrates. The method includes the steps of: applying a photosensitive resin composition containing a photosensitive resin and a colorant to the second transparent substrate on a light-outgoing side of the liquid crystal display device; irradiating light rays from an external light source so as to cure the resin composition at a position corresponding to that of a defective pixel on the polarizing plate on the light-outgoing side of the liquid crystal display device, the position being on optical paths of the light rays incident from the external light source; and removing an uncured resin composition from a surface of the polarizing plate on the light-outgoing side. According to the method of the invention, a light-shielding portion is easily formed at the position corresponding to that of the defective pixel by patterning.

3 Claims, 4 Drawing Sheets

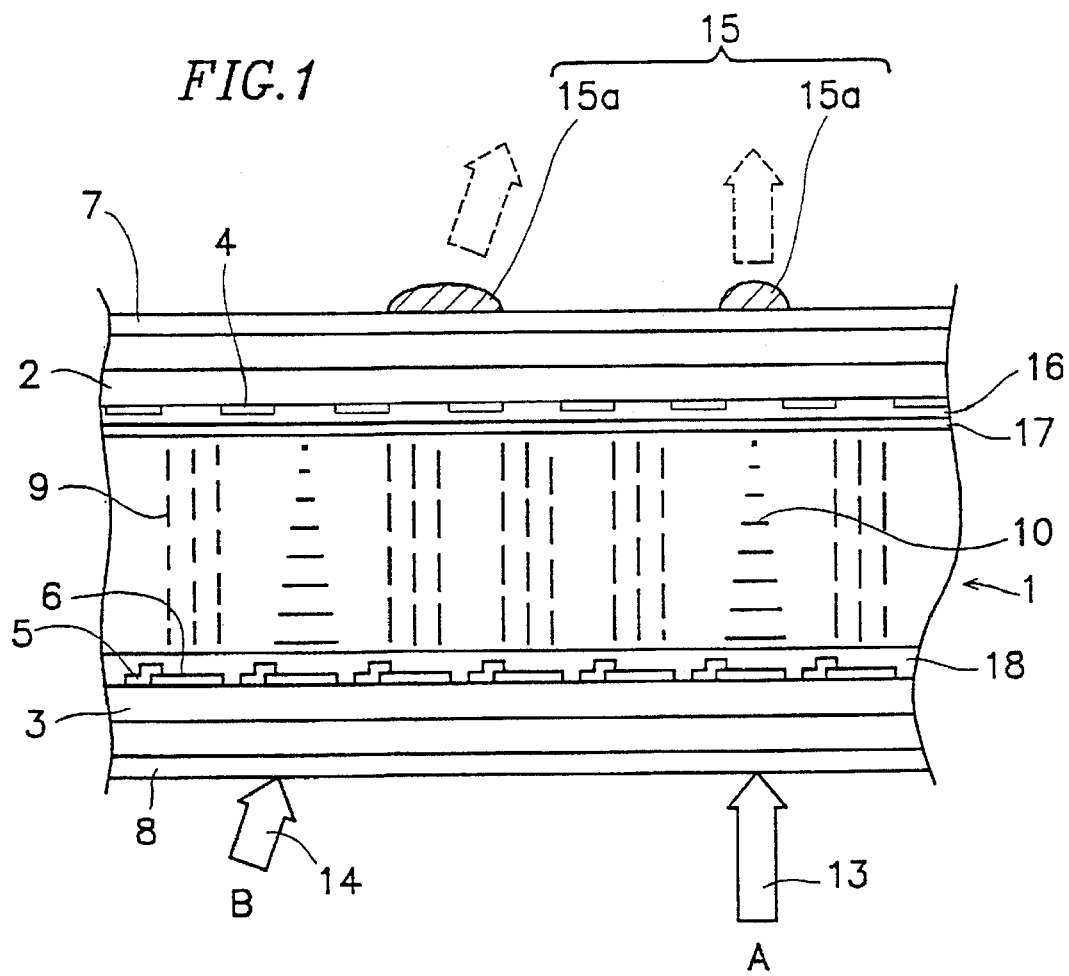

LIQUID CRYSTAL DISPLAY DEVICE AND METHOD FOR REPAIRING DEFECTIVE PORTIONS THEREOF

BACKGROUND OF THE INVENTION

1. Field of the Invention

The present invention relates to a liquid crystal display device (LCD) using switching elements, for example amorphous silicon thin film transistors (hereinafter simply referred to as a-Si TFTs) or polycrystalline silicon thin film transistors (hereinafter, p-Si TFTs), which is particularly effective for use as an optical shutter of a projector and a method for repairing the defective portions thereof.

2. Description of the Related Art

An active matrix type LCD includes pixel electrodes arranged in a matrix fashion on a substrate and switching elements formed so as to correspond to the respective pixel electrodes. An LCD drives the liquid crystal by charging/discharging the necessary charges to/from the pixel electrodes in accordance with the operation of the switching elements.

In general, an enormous number, i.e. from several tens of thousand to several hundreds of thousand, of switching elements and pixel electrodes, are formed on the substrate of the LCD in order to accomplish satisfactory display quality. In a process for forming such elements and electrodes on the substrate, some pixels will not operate even when a voltage is applied to the liquid crystal, mainly because the switching elements cannot operate or because the pixel electrodes are abnormally formed. The existence of non-operating pixels when a voltage is applied to the liquid crystal prevents the LCD from accomplishing satisfactory display quality.

An active matrix type LCD has two display modes. One of them is a Normally-Black mode in which light is shielded when no voltage is applied and light is transmitted when a voltage is applied. The other is a Normally-White mode in which light is transmitted when no voltage is applied and light is shielded when a voltage is applied.

FIG. 3 diagrammatically shows a conventional active matrix type LCD in a Normally-White mode. The LCD 1 includes glass substrates 3 and 2 which are spaced apart from each other. On the internal surface of the glass substrate 3, p-Si TFTs 5 are formed, and on the internal surface of the glass substrate 2, a black mask pattern (B/M) 4 is formed.

The configuration of the LCD 1 will be described in detail below.

On the glass substrate 3, pixel electrodes 6 made of ITO ($In_2O$—$SnO_2$ based) are arranged in a matrix fashion by performing a sputtering step, a photolithography step, and an ITO etching step. Switching elements, i.e. p-Si TFTs 5 are formed on the glass substrate 3 so as to correspond to the respective pixel electrodes 6 arranged in a matrix fashion. Over the glass substrate 3, a polyimide-based alignment film 18 is formed by an offset printing method. On the B/M 4 on the other glass substrate 2, pixel electrodes 16 made of ITO and a polyimide-based alignment film 17 are respectively formed. Each of the alignment films 18 and 17 is subjected to a rubbing treatment so as to obtain a twisted-nematic orientation. Polarizing plates 7 and 8 in a crossed-Nicols state are respectively attached to the external surfaces of the substrates 2 and 3. The LCD 1 in the Normally-White mode is configured as described above.

Next, a method for repairing the defective pixels of an active matrix type LCD in a Normally-White mode will be described.

When a sufficiently high voltage is applied to the liquid crystal 9 of the LCD 1, as indicated by the case C in FIG. 3, an incident light ray 13 transmitted through the polarizing plate 8 is shielded by the polarizing plate 7 if the pixels operate normally. This is because the polarizing direction of the incident light 13 is not changed by the liquid crystal 9. In a defective pixel, the polarizing direction of the incident light 13 transmitted through the polarizing plate 8 is rotated by the liquid crystal 10 by 90 degrees, so the incident light 13 is transmitted also by the polarizing plate 7. As a result, a leaking light ray 13' is observed so as to form a bright point, as indicated by the case E in FIG. 3. If a plurality of such defects exist, the defects are observed among the pixels as a group of bright points or line defects.

Methods for repairing such a pixel exhibiting the above-mentioned defect (hereinafter, referred to as a defective pixel) are described, for example, in Japanese Laid-Open Patent Publication Nos. 60-243635 and 3-243917.

According to the technique described in the former, as indicated by the case F in FIG. 3, a laser beam is irradiated onto a portion of an alignment film on the defective pixel so as to burn off the portion of the alignment film; and an orientation condition of the liquid crystal 11 over the defective pixel is disturbed so as to scatter the transmitted light, thereby repairing the defective pixel.

According to the technique described in the latter, as indicated by the case D in FIG. 3, a resin, ink, or the like into which a colorant including a black dye or a black pigment is mixed is applied to the position on the external surface of the glass substrate 2 which corresponds to that of the defective pixel by using a cotton needle, a pin of a nylon fiber, or the like and then the colorant is dried so as to form a light-shielding layer 12 including a light-shielding portion 12a and thereby repairing the defective pixel.

However, conventional repairing methods such as those described above for the defective pixel of the LCD in the Normally-White mode have the following problems.

According to the repairing method described in the Japanese Laid-Open Patent Publication No. 60-243635, the defective pixel is repaired by irradiating the laser beam so as to burn off the portion of the alignment film. As a result, deterioration, decomposition or alteration of the liquid crystal occurs in the defective pixel. In addition, the laser beam irradiation damages the switching elements. An active matrix type LCD is required to exhibit particularly high reliability. Therefore, such a repairing method which affects the display quality of the LCD is not preferable. Furthermore, an expensive laser repairing apparatus for repairing the defective pixel, and a detection apparatus for accurately detecting the position of the defective pixel are also required.

According to the repairing method described in the Japanese Laid-Open Patent Publication No. 3-243917, after the positions of the defective portions have been identified, the light-shielding layer 12, including a plurality of light-shielding portions 12a, is formed by applying a black resin, ink, or the like to the defective pixel portions with a pin, so that the area of each light-shielding portion 12a generally becomes larger than that of each defective pixel portion. Consequently, the light-shielding portions 12a inconveniently cover normal pixels adjacent to the defective pixels. Such a problem is particularly likely to occur in a super high-definition LCD having approximately a million and several hundreds of thousands of pixels with a pixel pitch of about 30 μm.

In addition, a detection apparatus for accurately detecting the positions of the defective pixels, and an apparatus for accurately applying a black resin, or the like onto the positions of the substrate corresponding to those of the defective pixel portions are required.

Moreover, according to the repairing methods described in the Japanese Laid-Open Patent Publication Nos. 60-243635 and 3-243917, in the situation where the LCD is used as an optical shutter for a projector, bright points are likely to occur because of the following reasons: specifically, the light rays emitted from an external light source are not incident at a right angle against the surface of the substrate of the LCD, but at a certain angle against the surface, so that the deviation occurs between the positions of the defective pixels and those of the bright points. Namely, the positions of the bright points on the substrate on the light-outgoing side deviate from those of the defective pixels on the substrate on the light-incoming side. Therefore, according to the above methods, bright points still occur.

SUMMARY OF THE INVENTION

The liquid crystal display device of this invention includes:

a first transparent substrate on an internal surface of which switching elements are formed;

a second transparent substrate which is provided being spaced apart from the first transparent substrate and on an internal surface of which a black mask pattern is formed; and liquid crystal interposed between the first and the second transparent substrates having a twisted-nematic orientation, wherein a light-shielding portion composed of a photosensitive resin composition containing a photosensitive resin and a colorant is formed at a position corresponding to that of a defective pixel on an external surface of at least one of the first and the second transparent substrates, the position being on optical paths of light rays incident from an external light source.

In one embodiment, a plurality of defective pixels occur dispersively or linearly and a plurality of light-shielding portions are formed.

According to the present invention, a method for repairing a defective pixel of a liquid crystal display device is provided. The liquid crystal display device includes a first transparent substrate on an internal surface of which switching elements are formed; a second transparent substrate which is provided being spaced apart from the first transparent substrate and on an internal surface of which a black mask pattern is formed; liquid crystal interposed between the first and the second transparent substrates having a twisted-nematic orientation; and two polarizing plates provided on external surfaces of the first and the second transparent substrates.

The method includes the steps of:

applying a photosensitive resin composition containing a photosensitive resin and a colorant to the second transparent substrate on a light-outgoing side of the liquid crystal display device;

irradiating light rays from an external light source so as to cure the resin composition at a position corresponding to that of a defective pixel on the polarizing plate on the light-outgoing side of the liquid crystal display device, the position being on optical paths of the light rays incident from the external light source; and removing an uncured resin composition from a surface of the polarizing plate on the light-outgoing side.

In one embodiment, the method includes a step in which the resin composition is applied to a portion surrounding the defective pixel on the polarizing plate on the light-outgoing side of the liquid crystal display device.

In another embodiment, the method includes a step in which the resin composition is applied to an entire surface of the polarizing plate on the light-outgoing side of the liquid crystal display device.

In still another embodiment, a protection film layer having solvent resistance is formed on the polarizing plate on the light-outgoing side.

In still another embodiment, the method further includes a step in which a pattern of the light-shielding portion is modified by trimming with laser beam irradiation.

Thus, the invention described herein makes possible the advantages of (1) providing a liquid crystal display device in which the defective pixels are repaired and the bright points are prevented from occurring; (2) providing a repairing method for the defective pixels of the liquid crystal display device in which light-shielding portions are easily formed in a self-alignment manner by a patterning method at the positions corresponding to those of the defective pixels; (3) providing a repairing method for the defective pixels of the liquid crystal display device in which neither an expensive laser repairing apparatus for repairing the positions of the defective pixels nor a detection apparatus for accurately detecting the positions of the defective pixels is not necessary, and; (4) providing a repairing method for the defective pixels of the liquid crystal display device allowing for increasing the production yield of the device in the production process and reducing the cost of the device.

These and other advantages of the present invention will become apparent to those skilled in the art upon reading and understanding the following detailed description with reference to the accompanying figures.

BRIEF DESCRIPTION OF THE DRAWINGS

FIG. 1 is a diagrammatical view of a liquid crystal display device according to an example of the present invention.

DESCRIPTION OF THE PREFERRED EMBODIMENTS

Figure 2A:
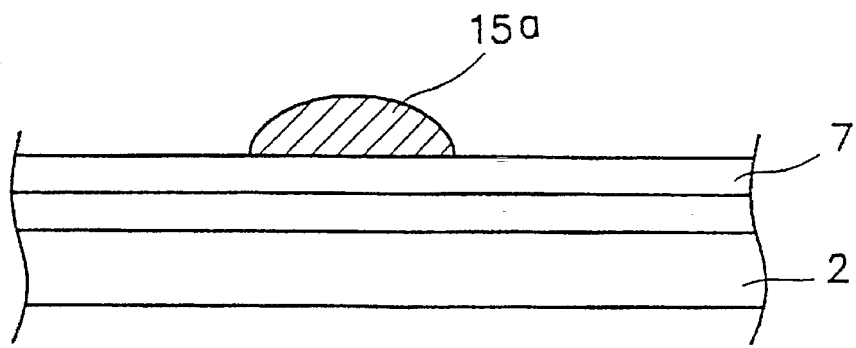
FIG. 2 is a diagrammatical view of a liquid crystal display device according to the third example of the present invention.

The present invention provides a novel method for repairing defective pixels of an LCD including a pair of transparent substrates; a liquid crystal layer interposed between the pair of substrates; and electrodes formed on the respective internal surfaces of the pair of substrates to form pixels.

A method for repairing the defective pixels will be described below.

In the vicinity of the defective pixel portions where some pixels will not operate even when a voltage is applied to the liquid crystal of the LCD, i.e. the portions through which light is always leaking in a Normally-White mode, a photosensitive resin composition containing a colorant and a photosensitive resin is applied to an external surface of at least one of the pair of substrates. At least one of a dye and a pigment can be used as the colorant.

In the case where a polarizing plate is provided on the external surface of the substrate, the resin is applied to the external surface of the polarizing plate.

Then, this LCD is placed in a projector so that the photosensitive resin composition is placed on the polarizing plate on the light-outgoing side. When light rays are irradiated from the projector towards the LCD, the light rays are leaking from the defective pixels to form bright points at the black display of the LCD. These leaking light rays cause the photosensitive resin composition, applied onto the polarizing plate, to cure. After a sufficient amount of light is irradiated so that the photosensitive resin composition is reacted to cure, the resin composition on the polarizing plate is processed with a predetermined developer, thereby removing uncured resin composition from the polarizing plate. In this way, light-shielding portions can be formed at the positions on the substrate corresponding to those of the light rays leaking through the defective pixel portions.

According to the above-mentioned method, even when a plurality of defective pixels are formed in an LCD, e.g. if a group of bright points, line defects, or the like exist, the patterns of the light-shielding portions can be formed at the positions on the substrate so as to correspond to those of the light rays leaking through the defects. As a result, the light-shielding portions can be formed at a time by a patterning method.

In a projection type optical system, the appropriate positions of the light-shielding portions to be formed by patterning on the substrate on the light-outgoing side sometimes largely deviate from those of the defective pixels on the substrate on the light-incoming side, thus the method of the present invention is particularly effective. Further, the present invention can be effectively applied to an optical system in which an LCD is placed so as to be inclined against the incident rays by several degrees.

In addition, according to the present invention, the light-shielding portions formed in the above-described manner can be trimmed by laser beam irradiation, so that the size of the light-shielding portions can be reduced. Thus the present invention can be effectively applied to bright points having a size of several μm. Additionally, the thickness of the light-shielding portions in which the intensity of the output rays leaking through the defective pixels is high can be made thick, whereas the thickness of the portions in which the intensity is low can be made thin. Also, the shapes of the patterns to be used can be varied in accordance with the shapes of the defective pixels. With respect to a material of the above-mentioned photosensitive resin composition, a negative type photosensitive material, i.e. a photocurable resin composition is used.

The present invention can be effectively applied to the repair of defective pixels of an active matrix type LCD in a Normally-White mode, and in particular to a projector. In repairing the defective pixels of an active matrix type LCD in a Normally-Black mode, a similar principle and operation to those used for the active matrix type LCD in the Normally-White mode can be effectively applied to such a repair by using a photosensitive resin composition containing a positive type photosensitive resin, with a colorant dispersed therein.

Hereinafter, the present invention will be described by way of illustrative examples with reference to the accompanying figures.

EXAMPLE 1

FIG. 1 is a diagrammatical view of an active matrix type LCD in a Normally-White mode. This LCD 1 is a super high-definition active matrix projection type LCD having fine pixels with a panel size of 2.0 inches and a pixel pitch of 30 μm×25 μm.

The LCD 1 includes a pair of glass substrates 2 and 3 which are provided so as to be spaced apart from each other, a pair of polarizing plates 7 and 8, and the liquid crystal 9. P-Si TFTs 5 are formed on the internal surface of the glass substrate 3. A B/M 4 is formed on the internal surface of the glass substrate 2. The polarizing plates 7 and 8 are provided respectively on the external surfaces of the glass substrates 2 and 3. The liquid crystal 9 is interposed between the pair of glass substrates 2 and 3.

On the internal surface of the glass substrate 3, pixel electrodes 6 made of ITO ($In_2O_3$—$SnO_2$ based), formed by performing a sputtering step, a photolithography step, and an ITO etching step, are arranged in a matrix fashion. Corresponding to the respective pixel electrodes 6 arranged in a matrix fashion, p-Si TFTs 5 serving as switching elements are formed on the glass substrate 3. A polyimide-based alignment film 18 is further formed over the glass substrate 3 by an offset printing method. Pixel electrodes 16 made of ITO and a polyimide-based alignment film 17 are formed in this order also on the internal surface of the glass substrate 2. Both of the polyimide-based alignment films 18 and 17 are subjected to a rubbing treatment so as to obtain a twisted-nematic orientation.

Onto the external surfaces of the pair of substrates 2 and 3, polarizing plates 7 and 8 are attached so as to be in a crossed Nicols state against the pair of substrates 2 and 3, thereby forming an LCD in a Normally-White mode. On the external surface of the polarizing plate 7, an antireflection film made of an inorganic material is stacked.

Generally, in the case where there are some defective pixels in an active matrix type LCD in a Normally-White mode under the above-mentioned structure, leaking light rays, which can be observed only in the defective pixel portions when a voltage is applied, show the existence of the defective pixels, e.g. a group of bright points, line defects, or the like.

Next, a method for repairing the defective pixels in the case where the size of the defective pixel portions of an LCD is small, and an amount of rays leaking through the bright points is relatively small will be described.

Figure 4:
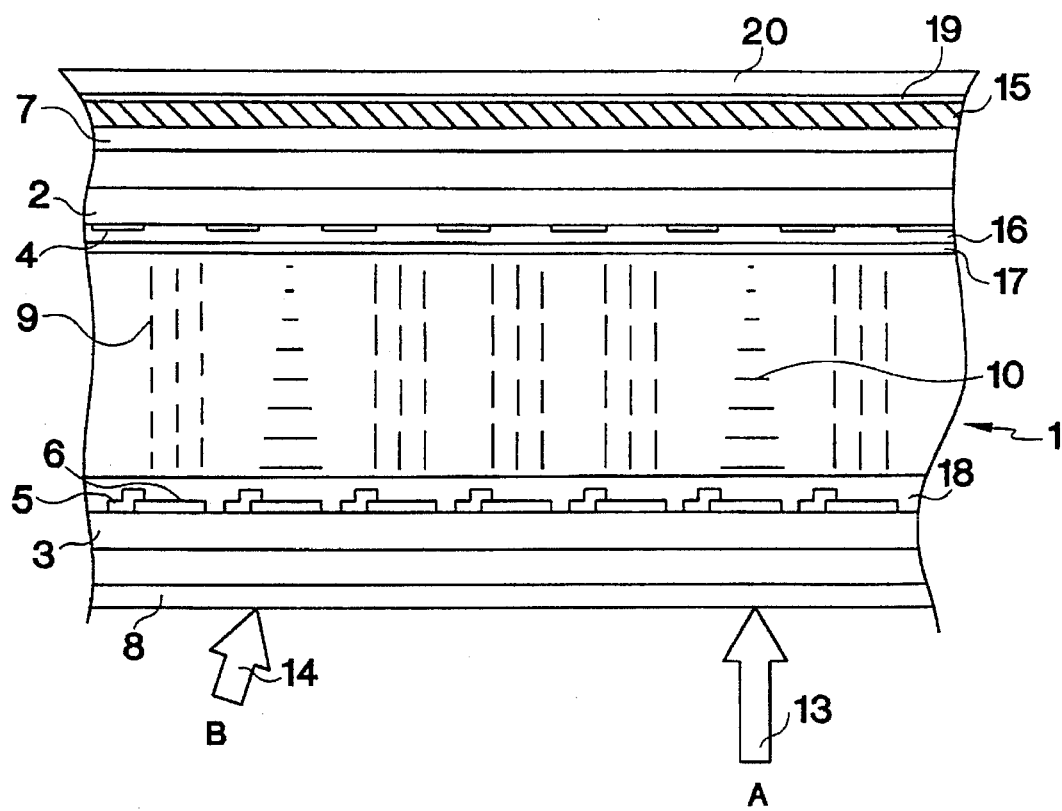
FIG. 4 is a diagrammatical view of a liquid crystal display device subject to the method for repairing defective pixels according to another embodiment of the present invention.

When no voltage is applied to the LCD 1, a colored photosensitive resin composition, e.g. Color Mosaic CB-2000 (trademark) (blue) manufactured by Fuji Hunt Electronics Technology Corp., FIG. 4 is applied onto the polarizing plate 7 provided on the light-outgoing side of the LCD 1 by using a brush, a spatula, or the like and then baked by an oven at 85° C. for 5 minutes. The thickness of the film 15 is preferably 100 μm to 300 μm.

Next, in order to increase the photosensitivity of the photosensitive resin composition 19, an oxygen-barrier composition, e.g. CP (name of the product) manufactured by Fuji Hunt Electronics Technology Corp., is applied onto the polarizing plate also by using a brush, a spatula, or the like and baked by an oven at 85° C. for 5 minutes, thereby forming an oxygen-barrier film. A light-shielding black cover 20 is placed completely over the oxygen-barrier film so that the photosensitive resin composition may not be sensitized by light rays other than those transmitted through the LCD.

Then, a voltage of approximately 5 to 6 volts, about four times as high as the threshold voltage of the liquid crystal, is applied to the LCD 1 so as to obtain a sufficiently black display. Subsequently, the LCD 1 is set into the projector by using a fixing jig for maintaining a predetermined angle.

As a result, as indicated by the case A in Figure 1, leaking light rays are transmitted only through the defective pixels, the photosensitive resin composition applied onto the optical paths of the light rays transmitted through the pixels is sensitized, and the photo-initiator contained in the photosensitive resin composition is decomposed to generate radicals. As a result, the polymerization reaction of the monomer in the photosensitive resin composition is initiated.

An irradiation amount necessary for the decomposition reaction of the photo-initiator will be described below.

Since the illuminance of a metal halide lamp outputting 150 W at a wavelength of 405 nm and incorporated in the protector is in the range of 10 to 15 mW/cm$^2$ on the polarizing plate 7 on the light-outgoing side of the LCD 1, the irradiation amount converted so as to correspond to one bright point is 20 mJ/cm$^2$. Accordingly, the irradiation (or exposure) is conducted to the portions including the margins for 8 to 10 minutes in order to give the irradiation amount.

Then the oxygen-barrier film is removed by washing it with water, and development is conducted for 2 or 3 minutes with a developer, diluted to a tenth, for a photosensitive resin composition, e.g. CD (name of the product) manufactured by Fuji Hunt Electronics Technology Corp., thereby removing the photosensitive resin composition on the unexposed portions. After that, the developer is washed away with water.

The antireflection film formed on the polarizing plate can protect the polarizing plate at the time of the development of the resin composition and the removal of the unnecessary photoresist (resin composition). To the contrary, in the case where this antireflection film is not provided, the surface of the polarizing plate is likely to scatter the light after the development treatment, and the scattering light may cause an uneven display.

By conducting the above-mentioned steps, leaking light rays are transmitted only through the defective pixels, and the photosensitive resin composition applied to the incident optical path is sensitized, so that the light-shielding portions are formed. The light-shielding portions 15a, formed in such a manner, make patterns so as to correspond only to the defective pixels.

As indicated by the case B in FIG. 1, in the situation where incident light 14 is largely inclined to the surfaces of the substrates 2 and 3 of the LCD 1, or in the case where the LCD 1 is placed so as to be largely inclined to the incident light 14, the positions of the bright points, that is, the positions at which the light-shielding portions 15a are formed, deviate vertically and horizontally in the surface of the substrate so as to correspond to those of the defective pixels. In other words, in this embodiment, the light-shielding portions are formed at the positions just overlapping the bright points if the LCD 1 is applied to a projection type optical system such as a projector.

In a projector in which an LCD 1 without light-shielding portions 15a is provided, the transmittance of normal pixels without any defects is approximately 0% at the black display, while the transmittance of the defective pixels is generally 88%. On the other hand, according to the method of this embodiment, the transmittance of the defective pixels is 17% with light-shielding portions 15a formed thereon. This result proves the remarkable light-shielding effect of this embodiment.

As described above, according to this embodiment of the invention, the light rays leaking through the defective pixels can always be shielded by the light-shielding portions, irrespective of whether a voltage is applied to the pixel electrodes or not.

That is, the light rays transmitted through the defective pixels are always shielded. Consequently, a black display can be conducted and the repair of the bright points occurring in the black display region is accomplished.

The thickness of the light-shielding portions 15a after the development is finished can be made 100 μm or less. Since the photosensitive resin composition on the unexposed portions is dissolved and removed by using a developer, no special apparatus is required for the application of the photosensitive resin composition.

EXAMPLE 2

A method for repairing the bright points of an active matrix projection type LCD in which the size of the defective pixel portions is large and a relatively large amount of light rays is leaking through the bright points will be described below.

When no voltage is applied to the LCD 1, a photosensitive resin composition, e.g. Color Mosaic CK-2000 (black) manufactured by Fuji Hunt Electronics Technology Corp., is applied onto the polarizing plate 7 (an antireflection film made of an inorganic material is stacked thereon) provided on the light-outgoing side of the LCD 1 by using a spinner method, or with a brush, a spatula, or the like. The applied resin composition is baked by an oven at 85° C. for 5 minutes. The thickness of the film is preferably in the range of 100 to 300 μm. A highly sensitive resin composition exhibiting high light-shieldingness, in particular, can be conveniently employed as the photosensitive resin composition.

Next, in order to increase the photosensitivity of the photosensitive resin composition, the same oxygen-barrier composition as that used in Example 1 is applied onto the polarizing plate by using a brush, a spatula, or the like. The applied composition is baked by an oven at 85° C. for 5 minutes, thereby forming an oxygen-barrier film. A light-shielding black cover is placed completely over the oxygen-barrier film, so as to prevent the photosensitive resin composition from being sensitized by light rays other than those transmitted through the LCD 1.

Next, a voltage of approximately 5 to 6 volts, about four times as high as the threshold voltage of the liquid crystal, is applied to the LCD 1, and then the LCD 1 is set into the projector by applying the LCD 1 to a predetermined fixing jig.

As a result, leaking light rays are transmitted only through the defective pixels, the photosensitive resin composition applied onto the optical paths of the light rays transmitted through the defective pixels, e.g. a group of bright points, line defects, or the like, is sensitized, and the photo-initiator is decomposed to generate radicals. As a result, the polymerization reaction of the monomer is initiated.

An irradiation amount necessary for the decomposition reaction of this photo-initiator is as follows. Since the illuminance of a metal halide lamp outputting 150 W at a wavelength of 405 nm and incorporated in the projector is in the range of 10 to 15 mW/cm$^2$ on the polarizing plate 7 on the light-outgoing side of the LCD 1, the irradiation amount converted so as to correspond to one bright point is 20 mJ/cm$^2$. Accordingly, the irradiation (or exposure) is conducted to the portions including the margins for 8 to 10 minutes in order to give the irradiation amount. Then the resin composition is baked by the oven at 85° C. for three minutes.

Next, the oxygen-barrier film is removed by washing it with water, and development is conducted for 2 or 3 minutes with a developer CD (name of the product: a developer for a photosensitive resin composition) diluted to a tenth, thereby removing the photosensitive resin composition on the unexposed portions. After that, the developer is washed away with water.

By conducting the above steps, the leaking light rays are transmitted only through the defective pixels, the photosensitive resin composition applied onto the optical paths of the incident light rays is sensitized, so that light-shielding portions 15a are formed. The light-shielding portions 15a, formed in such a manner, can be formed by patterning so as to correspond only to the defective pixels.

As indicated by the case B in FIG. 1, in the situation where the incident light 14 is largely inclined to the surfaces of the substrates 2 and 3 of the LCD 1, or in the case of using an optical system in which the LCD 1 is placed so as to be inclined to the incident light 14 by several degrees, the positions of the bright points, that is, the positions on which the light-shielding portions 15a are formed, are observed to deviate vertically and horizontally in the surface of the substrate in accordance with those of the defective pixels. Namely, the light-shielding portions are formed at the positions just overlapping the bright points if the LCD 1 is applied to a protection type optical system such as a protector.

In a projector in which an LCD 1 without light shielding portions 15a is provided, the transmittance of normal pixels without any defects is approximately 0% at the black display, while the transmittance of the defective pixels is generally 86%. On the other hand, according to the method of this embodiment, the transmittance of the defective pixels is 1% or less with light shielding portions 15a formed thereon. This result proves the light-shielding effect of this embodiment.

EXAMPLE 3

Next, a method for repairing the bright points of an active matrix projection type LCD in which the size of the defective pixels is extremely small and a large amount of light is leaking through the bright points will be described. The size of the bright points is approximately 10 µm×10 µm or less. Therefore, a highly sensitive photosensitive resin composition with high light-shieldingness is particularly required in this embodiment.

When no voltage is applied to the LCD 1, the same photosensitive resin composition as that used in Example 1, i.e. CB-2000 is applied onto the polarizing plate 7 (an antireflection film made of an inorganic material is stacked thereon) attached to the light-outgoing side of the LCD 1 by using a brush, a spatula, or the like and then baked by an oven at 85° C. for 5 minutes. The thickness of the film is preferably in the range of 100 µm to 300 µm.

Next, in order to increase the photosensitivity of the photosensitive resin composition, the same oxygen-barrier composition as that used in Example 1, i.e. CP is applied onto the polarizing plate also by using a brush, a spatula, or the like and baked by an oven at 85° C. for 5 minutes. A black cover is placed completely over the applied film.

Then, a voltage of approximately 5 to 6 volts, about four times as high as the threshold voltage of the liquid crystal, is applied to the LCD 1 so as to obtain a sufficiently black display. Subsequently, the LCD 1 is set into the projector by using a predetermined fixing jig.

As a result, leaking light rays are transmitted only through the defective pixels, the photosensitive resin composition applied onto the optical paths of the light rays transmitted through the defective pixels is sensitized, and the photo-initiator is decomposed to generate radicals. As a result, the polymerization reaction of the monomer is initiated.

An irradiation amount necessary for the decomposition reaction of the photo-initiator will be described below.

Since the illuminance of a metal halide lamp outputting 150 W at a wavelength of 405 nm and incorporated in the projector is in the range of 10 to 15 mW/cm$^2$ on the polarizing plate 7 on the light-outgoing side of the LCD 1, the irradiation amount converted so as to correspond to one bright point is 20 mJ/cm$^2$. Accordingly, the irradiation (or exposure) is conducted to the portions including the margins for 10 to 15 minutes in order to give the irradiation amount.

Then the oxygen-barrier film is removed by washing it with water, and development is conducted for 2 or 3 minutes with a developer diluted to a tenth for a photosensitive resin composition, e.g. CD (name of the product) manufactured by Fuji Hunt Electronics Technology Corp., thereby removing the photosensitive resin composition on the unexposed portions. After that, the developer is washed away with water.

By conducting the above steps, leaking light rays are transmitted only through the defective pixels, the photosensitive resin composition applied onto the optical paths of the incident light is sensitized, and then the patterns of the light-shielding portions 15a are formed.

Consequently, according to the method of this invention for forming patterns, it is possible to accurately form light-shielding portions having a size of 20 µm×20 µm.

Figure 2B:
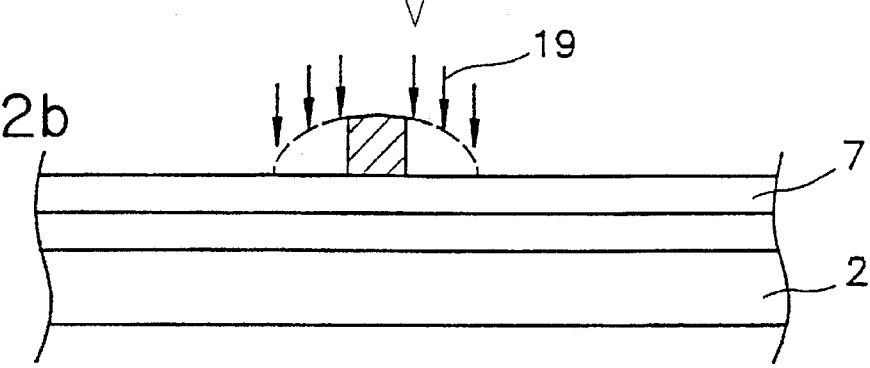
Figure 2C:
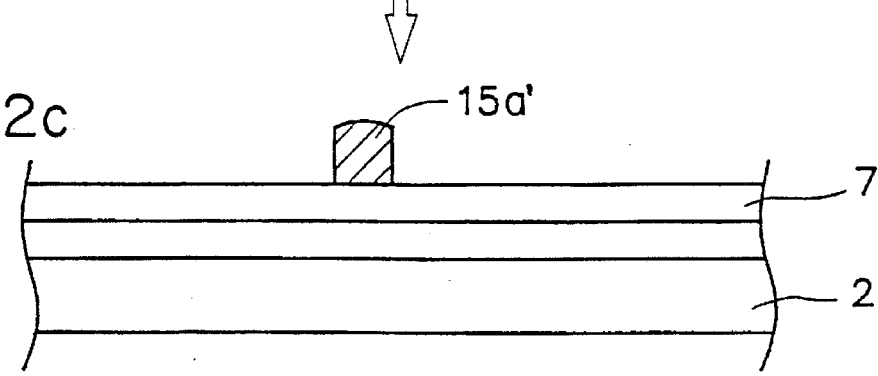
Figure 3:
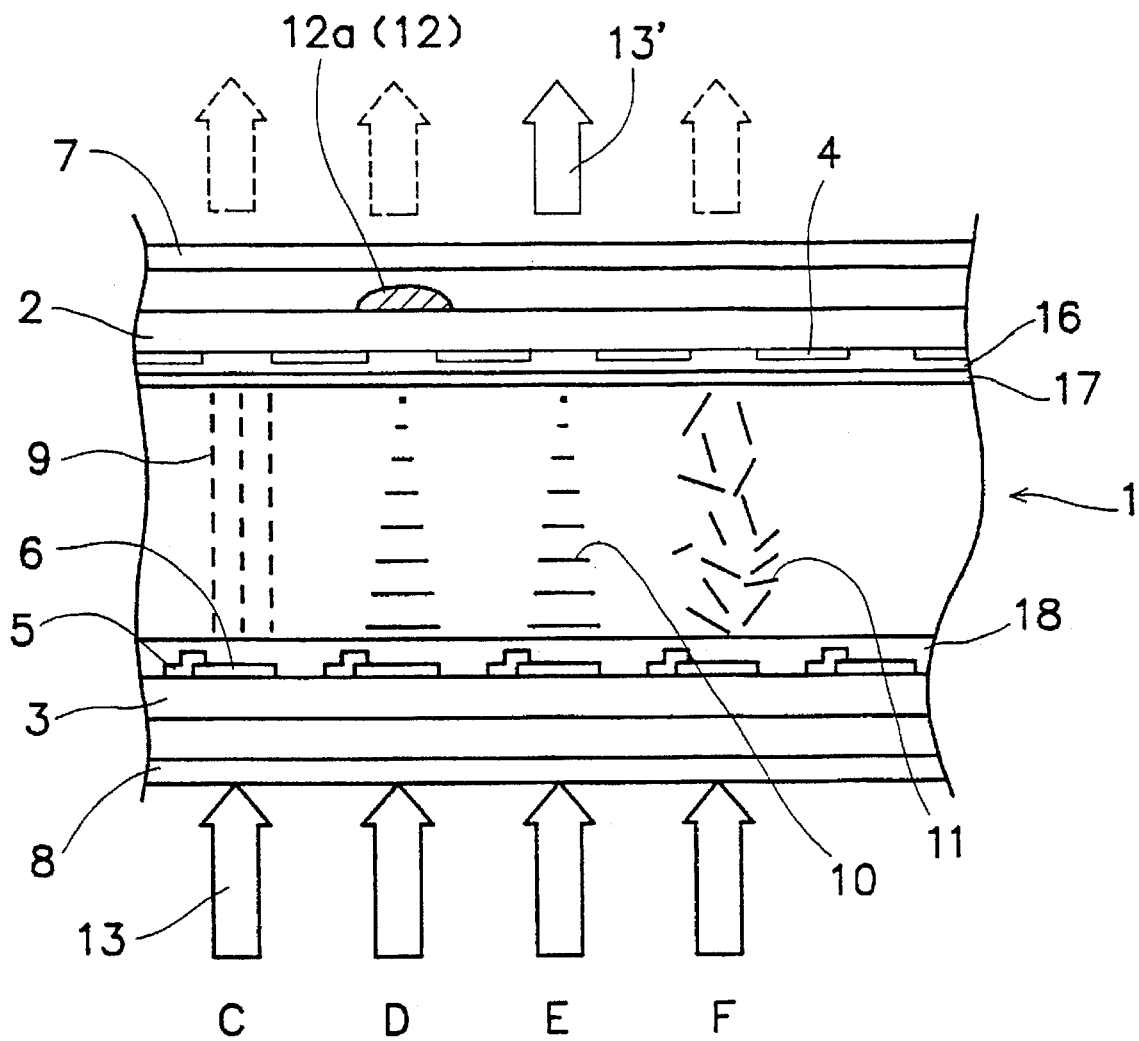
FIG. 3 is a diagrammatical view of a liquid crystal display device according to a conventional example.

With respect to the bright points having a size smaller than 20 µm×20 µm, those having a size of 10 µm×10 µm or less in particular, as shown in Figure 2, after the light-shielding portions having a size of 20 µm×20 µm are formed in accordance with the abovementioned method, light-shielding portions having a size of 10 µm×10 µm can be formed by repeating the irradiation of a laser beam 19. The method will be described in detail below.

When the laser beam 19 is irradiated by using a laser device, e.g. L-222 type manufactured by HOYA CORP. and setting the irradiation output of the laser beam to be 20%, a part of the light-shielding portions 15a is trimmed by the irradiation of the laser beam 19, and light-shielding portions 15a', the thickness of which is small and the end portion of which is turned up, are formed.

After repeating the irradiation of the laser beam 19, the surface of the polarizing plate 7 is washed with alcohol, and the formation of light-shielding portions 15a' is finished by patterning it. In this way, light-shielding portions 15a' having a size of approximately 8 µm×9 µm can be formed.

In a projector in which an LCD 1 without light-shielding portions 15a is provided, the transmittance of the normal pixels without any defects is approximately 0% at the black display, while the transmittance of the defective pixels is generally 48%. On the other hand, according to the method of this embodiment, the transmittance of the defective pixels is 1% or less with light-shielding portions 15a formed thereon. This result proves the light-shielding effect of this embodiment.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. A method for repairing a defective pixel of a liquid crystal display device comprising the steps of:
   applying a photosensitive resin composition containing a photosensitive resin and a colorant to a transparent substrate on a light-outgoing side of the liquid crystal display device;

applying an oxygen-barrier composition to the photosensitive resin composition and heating the oxygen-barrier composition to form an oxygen-barrier film;

providing a light-shielding black cover on the oxygen-barrier film;

applying an activating voltage to said liquid crystal display device;

irradiating a transparent substrate on a light-incoming side of said liquid crystal display device, so as to cure the resin composition at positions corresponding to that of defective pixels on the transparent substrate on the light-outgoing side of the liquid crystal display device; and removing the uncured resin composition from the surface of the transparent substrate on the light-outgoing side.

2. The method for repairing a defective pixel of a liquid crystal display device according to claim 1, wherein said photosensitive resin is a negative-type photosensitive resin.

3. The method for repairing a defective pixel of a liquid crystal display device according to claim 1, wherein said photosensitive resin is a positive-type photosensitive resin.

* * * * *